US010396362B2

(12) United States Patent
Yoon et al.

(10) Patent No.: US 10,396,362 B2
(45) Date of Patent: Aug. 27, 2019

(54) ELECTRODE ACTIVE MATERIAL SLURRY, PREPARATION METHOD THEREOF, AND ALL-SOLID SECONDARY BATTERY COMPRISING THE SAME

(71) Applicants: Hyundai Motor Company, Seoul (KR); Kia Motors Corporation, Seoul (KR); Industry-University Cooperation Foundation Hanyang University, Seoul (KR)

(72) Inventors: Yong Sub Yoon, Soeul (KR); Hong Seok Min, Gyeonggi-do (KR); Kyung Su Kim, Gyeonggi-do (KR); Oh Min Kwon, Busan (KR); Dong Wook Shin, Gyeonggi-do (KR); Sung Woo Noh, Seoul (KR); Lak Young Choi, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 206 days.

(21) Appl. No.: 15/341,013

(22) Filed: Nov. 2, 2016

(65) Prior Publication Data
US 2017/0214051 A1 Jul. 27, 2017

(30) Foreign Application Priority Data
Jan. 26, 2016 (KR) .................. 10-2016-0009615

(51) Int. Cl.
*H01M 4/62* (2006.01)
*H01M 10/0562* (2010.01)
(Continued)

(52) U.S. Cl.
CPC .............. *H01M 4/623* (2013.01); *H01M 4/04* (2013.01); *H01M 4/364* (2013.01); *H01M 4/622* (2013.01);
(Continued)

(58) Field of Classification Search
CPC ........ H01M 4/623; H01M 4/04; H01M 4/364; H01M 4/622; H01M 10/0525; H01M 10/0562
See application file for complete search history.

(56) References Cited

U.S. PATENT DOCUMENTS

2013/0216891 A1    8/2013   Byun et al.
2014/0030605 A1    1/2014   Kim et al.
(Continued)

FOREIGN PATENT DOCUMENTS

JP     2013-171838 A    9/2013
JP     2015-185252 A    10/2015
(Continued)

OTHER PUBLICATIONS

European Search Report for European Patent Application No. 16197036.3, dated Jan. 18, 2017, 7 pages.

*Primary Examiner* — Jayne L Mershon
(74) *Attorney, Agent, or Firm* — Mintz Levin Cohn Ferris Glovsky and Popeo, P.C.; Peter F. Corless

(57) ABSTRACT

Provided is an electrode active material slurry including a clustered complex and a slurry, wherein the clustered complex includes an electrode active material, a solid electrolyte, a conductive material, and a first binder, and the slurry includes a solvent and a second binder.
The electrode active material slurry may include the clustered complex including the first binder and the slurry including the second binder so as to decrease a surface area of the overall complex, such that adhesion property with the (Continued)

current collector may be sufficiently secured even by using a small amount of binder, and performance of the all-solid secondary battery may be further improved.

12 Claims, 5 Drawing Sheets

(51) Int. Cl.
    *H01M 10/0525*     (2010.01)
    *H01M 4/36*     (2006.01)
    *H01M 4/04*     (2006.01)
    *H01M 4/02*     (2006.01)

(52) U.S. Cl.
    CPC ... *H01M 10/0525* (2013.01); *H01M 10/0562* (2013.01); *H01M 2004/021* (2013.01); *H01M 2004/027* (2013.01); *H01M 2004/028* (2013.01); *H01M 2300/0068* (2013.01)

(56) References Cited

U.S. PATENT DOCUMENTS

| | | | |
|---|---|---|---|
| 2014/0162139 A1 | 6/2014 | Hoshiba et al. | |
| 2015/0147660 A1* | 5/2015 | Fujiki | H01M 10/0562 |
| | | | 429/306 |
| 2016/0336587 A1* | 11/2016 | Jung | H01M 4/58 |

FOREIGN PATENT DOCUMENTS

| | | |
|---|---|---|
| KR | 2010-0006396 A | 1/2010 |
| KR | 2010-0095349 A | 8/2010 |
| KR | 2013-0071365 A | 6/2013 |
| KR | 10-2014-0008957 A | 1/2014 |
| KR | 2014-0074176 A | 6/2014 |
| KR | 2015-0060517 A | 6/2015 |

* cited by examiner

ELECTRODE ACTIVE MATERIAL SLURRY, PREPARATION METHOD THEREOF, AND ALL-SOLID SECONDARY BATTERY COMPRISING THE SAME

CROSS-REFERENCE TO RELATED APPLICATION

This application is based on and claims the benefit of priority to Korean Patent Application No. 10-2016-0009615, filed on Jan. 26, 2016 in the Korean Intellectual Property Office, the disclosure of which is incorporated herein in its entirety by reference.

TECHNICAL FIELD

The present invention relates to an electrode active material slurry including two different kinds of binders, a preparation method thereof, and an all-solid secondary battery comprising the same.

BACKGROUND

As a lithium-ion secondary battery has a large electrochemical capacity, a high operating potential and excellent charge-discharge cycle characteristics, the demand of the lithium-ion secondary battery has been increased to be used for mobile information terminals, mobile electronic devices, small household power storage devices, motorcycles using a motor as a power source, electric vehicles, hybrid electric vehicles, and the like. According to the increase in the usage, the lithium-ion secondary battery has been required to have improved safety and high performance. However, since the existing lithium-ion secondary battery using a nonaqueous electrolyte in which lithium salt is dissolved in an organic solvent, as an electrolyte, is easily ignited at a temperature of about 150° C., safety issue may arise.

Accordingly, in recent years, an all-solid secondary battery using a solid electrolyte including a noncombustible inorganic material has been actively researched for the purpose of improving safety.

The all-solid secondary battery using the solid electrolyte includes an electrolyte layer including solid electrolyte, and a cathode layer and an anode layer each including solid electrolyte. The cathode layer and the anode layer are formed on both surfaces of the electrolyte layer, and current collectors are combined with each electrode.

A compression molding method has been used as a manufacturing method of the all-solid secondary battery. For example, the compression molding method includes sequentially adding and pressing component powders of a battery in a cylindrical mold, and combining current collectors on a cathode and an anode. However, the compression molding method has a problem in that since it is difficult to uniformly deposit the cathode layer on the electrolyte layer, uniform current distribution in the cathode is not formed, such that deviation of current density may be caused, which may reduce performance of a secondary battery. In addition, since a mold or a device required according to area of the electrode to be manufactured is separately required, problems in view of process may occur.

In order to overcome the above-described problems of the manufacturing method of the all-solid secondary battery, in the related arts, a method of casting a slurry in which an electrode active material is mixed with a binder and a solvent on a current collector, followed by drying, and sequential lamination casting thereon, and a method of mixing electrode active materials of each layer with a binder and a solvent, followed by casting to form a thick film, and lamination process adhering each sheet, have been reported. According to these manufacturing methods, uniform electrodes may be formed and coating area may be increased, thereby increasing area of the electrode.

However, since sulfide-based solid electrolyte has high reactivity to moisture and polar materials, when applying a binder solution used in the existing lithium secondary battery, the method of preparing electrode active material slurry and casting the slurry on the current collector may have a problem. Therefore, at the time of preparing the slurry for manufacturing the thick film, a binder and a solvent that do not react with the sulfide-based solid electrolyte are required to be used.

In addition, at the time of adding the binder and the solvent for forming the thick film, when a content of the binder required for forming adhesion between the current collector and the electrodes is small, the current collector and the electrodes may be delaminated, and when the content of the binder is large, resistance in the electrodes may be increased, which may reduce electrode properties.

Therefore, an electrode slurry capable of strongly adhering the current collector while reducing the content of the binder, thereby excellently maintaining electrode properties, and a manufacturing method of an all-solid secondary battery have been demanded.

SUMMARY

In preferred aspects, the present invention provides an electrode active material slurry having improved dispersibility and adhesion property to strongly adhere the electrode active material with a current collector, thereby excellently maintaining electrode properties. The term "slurry" as used herein refers to a fluid mixture comprising a solid content and a liquid (e.g. solvent), as the solid content may remain insoluble in the liquid. The slurry suitably may have a solid content greater than about 20 wt %, greater than about 30 wt %, greater than about 40 wt %, greater than about 50 wt %, greater than about 60 wt %, greater than about 70 wt % greater than about 80 wt %, or greater than about 90 wt %, when the solid content is determined by weight percent of the solid to the total weight of the slurry. Preferably, the solid content of the slurry of the present invention may range from about 20 to 90 wt %, from about 30 to 80 wt %, or from about 40 to 70 wt %. Exemplary slurry in the present invention suitably may have a solid content from about 50 to about 60 wt %, for example, 65 wt %.

In addition, the present invention provides a preparation method of an electrode active material slurry by using a reduced amount of binders. Further, the present invention provides an electrode including the electrode active material slurry. The present invention also provides an all-solid secondary battery including the electrode.

In one aspect, provided is an electrode active material slurry comprising: a clustered complex and a slurry. Particularly, the clustered complex may comprise an electrode active material, a solid electrolyte, a conductive material, and a first binder, and the slurry may comprise a solvent and a second binder. Further, the first binder may be applied on a surface of the electrode active material, and the second binder may be present between the electrode active materials.

The first binder suitably may be in a form of particles having an average particle size ($D_{50}$) of about 0.01 µm to 10 µm and the first binder may be any one selected from the group consisting of polyvinyl alcohol (PVA), polytetrafluoroethylene (PTFE), polyethylene oxide (PEO), polyvinyl pyrolidone (PVP), copolymers of polyacrylic acid ester, chlorinated polyethylene, polymethacrylic acid ester, ethylene-vinyl alcohol copolymers, polyimide, polyamide, polyamideimide, and polymethylmethacrylate (PMMA), or mixtures thereof.

The second binder suitably may be the second binder may be any one selected from the group consisting of styrene butadiene rubber (SBR), butadiene rubber (BR), nitrile butadiene rubber (NBR), styrene butadiene styrene block polymer (SBS), styrene ethylene butadiene block polymer (SEB), styrene-(styrene butadiene)-styrene block polymer, natural rubber (NR), isoprene rubber (IR), ethylene-propylene-diene terpolymer (EPDM) and poly(ethylene-co-propylene-co-5-methylene-2-norbornene), or mixtures thereof.

A weight ratio of the first binder and the second binder suitably may be about 1:0.1 to 2 (parts by weight).

The first binder suitably may have a content of about 1 to 5 wt % based on 100 wt % of a mixture of the active material and the solid electrolyte.

The second binder suitably may have a content of about 1 to 10 wt % based on 100 wt % of a mixture of the active material and the solid electrolyte.

The clustered complex suitably may have a specific surface area of about 0.5 to 1 m$^2$/g.

The electrode active material suitably may have a content of about 50 to 85 wt %, the solid electrolyte suitably may have a content of about 10 to 40 wt %, the conductive material suitably may have a content of about 2 to 5 wt %, and the first binder suitably may have a content of about 1 to 5 wt %, all the wt % based on 100 wt % of a mixture of the active material and the solid electrolyte.

The solid electrolyte suitably may be a sulfide-based solid electrolyte.

When the electrode is a cathode, the electrode active material slurry suitably may have a solid content of about 40 to 70 wt % based on a total weight of a cathode active material slurry.

In another aspect, provided is a preparation method of an electrode active material slurry comprising: preparing a clustered complex by mixing an electrode active material, a solid electrolyte, a conductive material, and a first binder, and applying energy; and mixing the clustered complex with a slurry including a solvent and a second binder.

The energy applied suitably may have a range of about 0.01 to 0.5 G on the basis of G-value calculation. The energy may be applied by a mechanical milling method or a kneading method selected from the group consisting of ball mill, planetary mill, stirred ball mill, SPEX mill, Planetary mill, Attrition mill, Magento-ball mill, vibrating mill, mortar, non bubbling kneader, planetary mixer, and voltax mixer.

The first binder suitably may be in a form of particles having an average particle size ($D_{50}$) of about 0.01 μm to 10 μm and first binder may be any one selected from the group consisting of polyvinyl alcohol (PVA), polytetrafluoroethylene (PTFE), polyethylene oxide (PEO), polyvinyl pyrrolidone (PVP), copolymers of polyacrylic acid ester, chlorinated polyethylene, polymethacrylic acid ester, ethylenevinyl alcohol copolymers, polyimide, polyamide, polyamideimide, and polymethylmethacrylate (PMMA), or mixtures thereof.

The second binder suitably may be any one selected from the group consisting of styrene butadiene rubber (SBR), butadiene rubber (BR), nitrile butadiene rubber (NBR), styrene butadiene styrene block polymer (SBS), styrene ethylene butadiene block polymer (SEB), styrene-styrene butadiene)-styrene block polymer, natural rubber (NR), isoprene rubber (IR), ethylene-propylene-diene terpolymer (EPDM) and poly(ethylene-co-propylene-co-5-methylene-2-norbornene), or mixtures thereof.

A weight ratio of the first binder and the second binder suitably may be about 1:0.1 to 2 (parts by weight).

The first binder suitably may have a content of about 1 to 5 wt % based on 100 wt % of a mixture of the active material and the solid electrolyte.

The second binder suitably may have a content of about 1 to 10 wt % based on 100 wt % of a mixture of the active material and the solid electrolyte.

In another aspect, provided is a cathode including an electrode active material layer including the electrode active material slurry as described herein, and a base layer.

Further provided is an all-solid secondary battery including the cathode as described herein.

Other aspect of the invention are disclosed infra.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
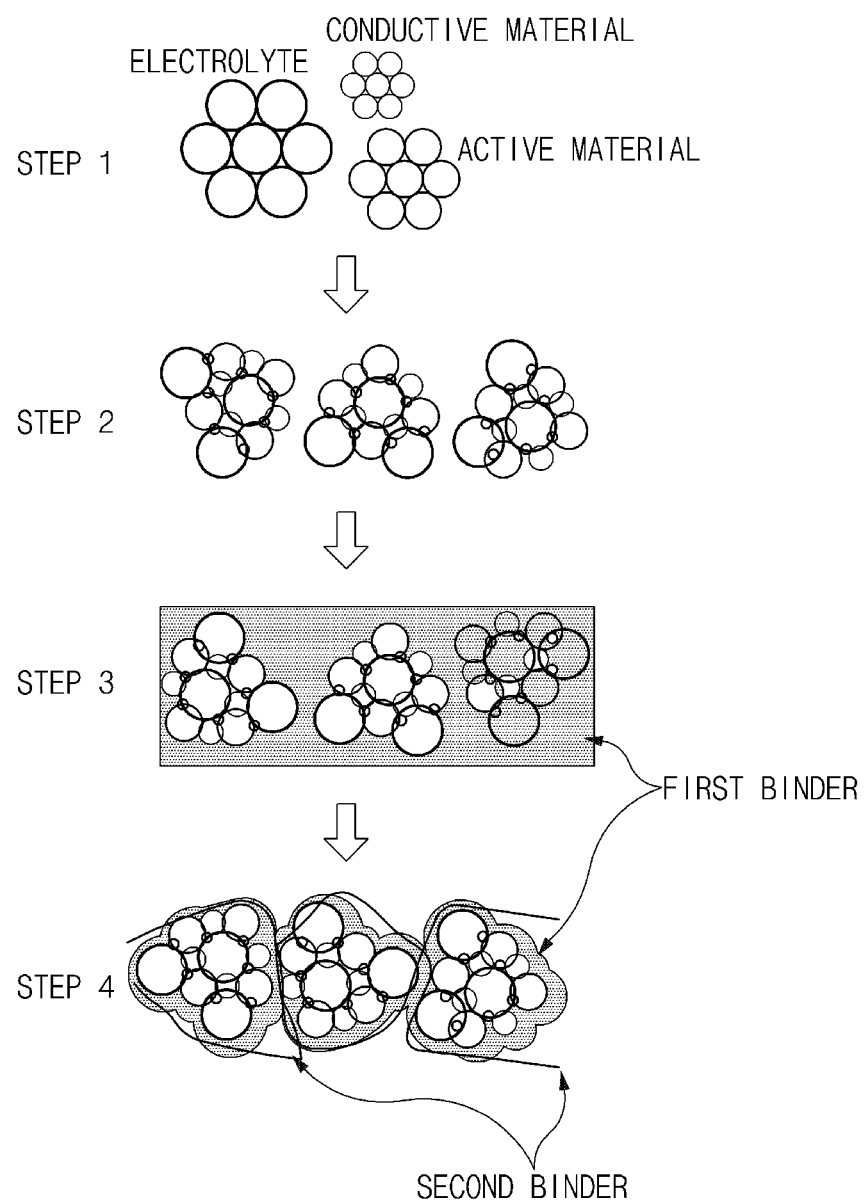
FIG. 1 illustrates an exemplary manufacturing method of an exemplary electrode and an exemplary electrode active material layer applied on a substrate according to an exemplary embodiment of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, the present invention will be described in more detail to assist in understanding the technical idea of the present invention.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the terms in order to describe their own inventions in best mode.

An electrode active material slurry of the present invention may include a clustered complex and a slurry. In particular, the clustered complex may include an electrode active material, a solid electrolyte, a conductive material, and a first binder, and the slurry includes a solvent and a second binder.

The electrode active material slurry according to an exemplary embodiment of the present invention may include the clustered complex having a clustered shape by combining the electrode active material, the solid electrolyte, the conductive material, and the first binder through pre-treatment (i.e. pre-clustering), and the slurry including the second binder, thereby decreasing a surface area of an overall complex. Accordingly, adhesion with a current collector may be sufficiently secured even with a small amount of binders, and performance of an all-solid secondary battery may be further improved.

Each component is specifically described as follows.

<Clustered Complex>

The clustered complex included in the electrode active material slurry of the present invention refers to a complex which may be clustered by combining the electrode active material, the solid electrolyte, and the conductive material with the first binder through energy application.

The electrode active material slurry according to an exemplary embodiment of the present invention may include the clustered complex to decrease the surface area of the complex, and accordingly, small specific surface area may be implemented to improve ion conductivity or electron conductivity between the active material and the conductive material in the complex, thereby improving capacity of a secondary battery, and reducing content of the binders used for preparing the slurry.

The first binder may be in a form of particles having strong adhesion and having an average particle size ($D_{50}$) of about 0.01 μm to 10 μm, of about 0.01 μm to 5 μm, or particularly of about 0.01 μm to 1 μm according to purposes, and may strongly adhere interparticle microstructures of the electrode active material, the solid electrolyte and the conductive material that are solids, through particle coagulation. In addition, the first binder may less affect contact area among the solids to minimize an increase in resistance of an electrochemical reaction. When the average particle size of the first binder is greater than about 10 μm, the first binder may not be sufficiently dissolved, such that it may be difficult to sufficiently secure a desired adhesion effect.

Meanwhile, when only the second binder capable of combining the solids into a net form is used without using the first binder in the form of particles according to the related art, the second binder may be mostly responsible for the interparticle adhesion, such that a high content of the binder may be required. However, when the content of the binder is high, resistance in the electrode may be increased, which may reduce performance of the secondary battery.

In the present invention, the average particle size of the particle may be defined as a particle size on the basis of about 50% of particle size distribution of the particle. The average particle size ($D_{50}$) of the particle according to an exemplary embodiment of the present invention may be measured by using a laser diffraction method. The laser diffraction method may measure a particle size ranging from sub-micron to several millimeters (mm), and to obtain high reproducibility and high degradability results.

The first binder according to an exemplary embodiment of the present invention suitably may be any one selected from the group consisting of polyvinyl alcohol (PVA), polytetrafluoroethylene (PTFE), polyethylene oxide (PEO), polyvinyl pyrolidone (PVP), copolymers of polyacrylic acid ester, chlorinated polyethylene, polymethacrylic acid ester, ethylene-vinyl alcohol copolymers, polyimide, polyamide, polyamideimide, and polymethylmethacrylate (PMMA), or mixtures thereof. Preferably, the first binder may be any one selected from the group consisting of polytetrafluoroethylene (PTFE), polyvinyl alcohol (PVA) and polyethylene oxide (PEO), or mixtures thereof.

The first binder may have a content of about 1 to 5 wt %, or particularly of about 2 to 4 wt %, based on 100 wt % of a mixture of the active material and the solid electrolyte. Within the above-described range, the first binder may improve interparticle adhesion among the electrode active material, the solid electrolyte, and the conductive material, and may improve output characteristic of the secondary battery. When the content of the first binder is less than about 1 wt %, interparticle adhesion effect of the electrode active material, the solid electrolyte, and the conductive material may not be significant. On the contrary, when the content of the first binder is greater than about 5 wt %, agglomeration among the particles may occur due to the excess of the binder, and accordingly, resistance may be increased and ion conductivity may be decreased.

Meanwhile, the electrode active material may be a cathode active material or an anode active material, as the electrode active material, active material generally used for a cathode or an anode of a secondary battery may be used.

For example, the cathode active material used for the cathode is not specifically limited as long as it is a material capable of reversibly absorbing and desorbing lithium ions. For example, the cathode active material may be layered compounds such as lithium cobalt oxide ($LiCoO_2$), lithium nickel oxide ($LiNiO_2$), $Li[Ni_xCo_yMn_zMv]O_2$ (wherein M is any one element selected from the group consisting of Al, Ga and In, or combinations thereof; and $0.3 \leq x < 1.0$, $0 \leq y, z \leq 0.5$, $0 \leq v \leq 0.1$, $x+y+z+v=1$), $Li(Li_aM_{b-a-b}M'_b)O_{2-c}A_c$ (wherein $0 \leq a \leq 0.2$, $0.6 \leq b \leq 1$, $0 \leq b' \leq 0.2$, $0 \leq c \leq 0.2$; M includes Mn and at least one selected from the group consisting of Ni, Co, Fe, Cr, V, Cu, Zn and Ti; M' is at least one selected from the group consisting of Al, Mg and B; A is at least one selected from the group consisting of P, F, S and N) or compounds substituted with one or more transition metal(s);

lithium manganese oxides such as Chemical Formulas $Li_{1+y}Mn_{2-y}O_4$ (wherein y is 0 to 0.33), $LiMnO_3$, $LiMn_2O_3$, $LiMnO_2$, and the like; lithium copper oxides ($Li_2CuO_2$); vanadium oxides such as $LiV_3O_8$, $LiFe_3O_4$, $V_2O_5$, $Cu_2V_2O_7$, and the like; Ni site type lithium nickel oxides represented by Chemical Formula $LiNi_{1-y}M_yO_2$ (wherein M is Co, Mn, Al, Cu, Fe, Mg, B or Ga, and y is 0.01 to 0.3); lithium manganese composite oxides represented by either Chemical Formula $LiMn_{2-y}M_yO_2$ (wherein M is Co, Ni, Fe, Cr, Zn or Ta, y is 0.01 to 0.1) or $Li_2Mn_3MO_8$ (wherein M is Fe, Co, Ni, Cu or Zn); $LiMn_2O_4$ in which Li is partially substituted with alkaline earth metal ions; disulfide compounds; $Fe_2(MoO_4)_3$, and the like, but the present invention is not limited thereto.

As the anode active material used for the anode, carbon materials, lithium metal, silicon, tin, and the like, capable of absorbing and desorbing lithium ions may be generally used. The anode active material may be preferably the carbon material, and all of low crystalline carbon and high crystalline carbon, and the like, may be used as the carbon material. Representative examples of the low crystalline carbon may include soft carbon and hard carbon. Representative examples of the high crystalline carbon may include natural graphite, Kish graphite, pyrolytic carbon, mesophase pitch based carbon fiber, meso-carbon microbeads, mesophase pitches, and high-temperature sintered carbons such as petroleum, coal tar pitch derived cokes, and the like.

In addition, the solid electrolyte may be a sulfide-based solid electrolyte. The sulfide-based solid electrolyte may contain, for example, sulfur (S) as a first element, lithium (Li) as a second element, and at least one element selected from the group consisting of silicon (Si), boron (B) and phosphorus (P), as a third element. In order to improve ion conductivity, the sulfide-based solid electrolyte may contain germanium (Ge), etc., in addition to the elements, particularly, $Li_2S$—$P_2S_5$. The sulfide-based solid electrolyte may contain sulfides such as $SiS_2$, $GeS_2$, $B_2S_3$, etc., in addition to $Li_2S$—$P_2S_5$ known to have high lithium ion conductivity as compared to other inorganic compounds. In addition, the solid electrolyte may be an inorganic solid electrolyte made by adding appropriate $Li_3PO_4$, halogen, halogen compounds, or the like, to the inorganic solid electrolyte obtained from $Li_2S$—$P_2S_5$, $SiS_2$, $GeS_2$, $B_2S_3$ or mixtures thereof. Lithium sulfide for preparing the sulfide-based solid electrolyte may be any industrially available lithium sulfide, preferably, lithium sulfide with high purity. For example, for the lithium sulfide, a total content in lithium salt of sulfur oxide may be about 0.15 mass % or less, or particularly of about 0.1 mass % or less, and a content of N-methyl aminobutyric acid lithium may be about 0.15 mass % or less, or particularly of about 0.1 mass % or less.

Meanwhile, the conductive material is not specifically limited as long as it has conductivity without causing chemical change to the all-solid secondary battery. For example, the conductive material may be graphite such as natural graphite, artificial graphite, etc.; carbon black such as carbon black, acetylene black, Ketjen black, channel black, furnace black, lamp black, thermal black, and the like; conductive fibers such as carbon fiber, metal fiber, etc.; conductive tubes such as carbon nanotube, and the like; metal powder such as fluorocarbon, aluminum, nickel powder, and the like; conductive whiskers such as zinc oxide, potassium titanate, and the like; conductive metal oxides such as titanium oxide, and the like; conductive materials such as polyphenylene derivatives, and the like.

In the electrode active material slurry according to an exemplary embodiment of the present invention, the clustered complex may have a specific surface area of about 0.1 to 10 $m^2/g$, or particularly of about 0.5 to 1 $m^2/g$. The clustered complex may have the above-described range of specific surface area, thereby further improving adhesion of the solid electrolyte, the electrode active material, the conductive material, and the first binder, and maximally maintaining contact area among particles in the complex.

In the present invention, the specific surface area may be measured by a Brunauer-Emmett-Teller (BET) method. For example, the specific surface area may be measured by a BET 6-point method according to a nitrogen gas adsorption flow process using a pore size distribution meter (Porosimetry analyzer, Bell Japan Inc., Belsop-II mini).

In addition, in the clustered complex according to an exemplary embodiment of the present invention, the electrode active material may have a content of about 50 to 85 wt %, the solid electrolyte may have a content of about 10 to 40 wt %, the conductive material may have a content of about 2 to 5 wt %, and the first binder may have a content of about 1 to 5 wt %, all the wt % are based on 100 wt % of a mixture of the active material and the solid electrolyte. Preferably, the electrode active material may have a content of about 60 to 85 wt %, the solid electrolyte may have a content of about 12 to 35 wt %, the conductive material may have a content of about 2 to 4 wt %, and the first binder may have a content of about 1 to 4 wt %, all the wt % are based on 100 wt % of a mixture of the active material and the solid electrolyte. The clustered complex may include each component having the above-described range of content, such that an electrode having good ion conductivity and excellent adhesion among respective particles may be formed.

<Slurry>

The slurry included in the electrode active material slurry of the present invention may include a solvent and a second binder.

The electrode active material slurry according to an exemplary embodiment of the present invention may include the second binder and the solvent that do not react with the sulfide-based solid electrolyte in the slurry in order to prepare the clustered complex into a slurry.

The second binder may combine the clustered complex into a net form. The second binder suitably may be a hydrocarbon-based polymer binder that does not react with the sulfide-based solid electrolyte. For example, the second binder may be any one selected from the group consisting of styrene butadiene rubber (SBR), butadiene rubber (BR), nitrile butadiene rubber (NBR), styrene butadiene styrene block polymer (SBS), styrene ethylene butadiene block polymer (SEB), styrene-(styrene butadiene)-styrene block polymer, natural rubber (NR), isoprene rubber (IR), ethylene-propylene-diene terpolymer (EPDM) and poly(ethylene-co-propylene-co-5-methylene-2-norbornene), or mixtures thereof. In addition, the second binder may be preferably any one selected from the group consisting of nitrile butadiene rubber (NBR), styrene butadiene rubber (SBR), and poly(ethylene-co-propylene-co-5-methylene-2-norbornene), or mixtures thereof.

The second binder suitably may have a content of about 1 to 10 wt %, of about 1 to 5 wt %, or particularly of about 1 to 3 wt %, based on 100 wt % of a mixture of the active material and the solid electrolyte. The electrode active material slurry according to an exemplary embodiment of the present invention may include the clustered complex, thereby reducing the content of the second binder. When the content of the second binder is less than the above-described range, for example, less than about 1 wt %, adhesion effect with the current collector may not be significant. On the contrary, when the content of the second binder is greater than the above-described range, for example, greater than about 10 wt %, dispersibility among particles may be reduced, and resistance may be increased due to the excess of the binder, thereby reducing performance of the secondary battery.

According to an exemplary embodiment of the present invention, a weight ratio of the first binder and the second binder may be about 1:0.1 to 2 (parts by weight), of particularly about 1:02 to 1 (parts by weight).

The electrode active material slurry according to an exemplary embodiment of the present invention may include the clustered complex including the first binder, thereby reducing the content of the second binder included in the slurry, and accordingly, capacity propety, output property and energy density of the secondary battery may be further improved.

Meanwhile, the solvent suitably may be any one selected from the group consisting of cyclohexanone, toluene, xylene, tetralin, isopropyl alcohol, undecane, dodecane, tridecane, 1,2-octane diol, 1,2-dodecane diol, and 1,2-hexadecane diol, or mixtures thereof, specifically, xylene, dodecane, or mixtures thereof.

In the electrode active material slurry according to an exemplary embodiment of the present invention, the first binder may be applied on a surface of the electrode active material, and the second binder may be present and crossing between the electrode active materials (FIG. 1).

In addition, the clustered complex may be mixed with the slurry, such that the electrode active material slurry may have a solid content of about 40 to 70 wt %.

Further, the present invention provides a preparation method of an electrode active material slurry including: preparing a clustered complex by mixing an electrode active material, a solid electrolyte, a conductive material, and a first binder, and applying energy (step (i)); and mixing the clustered complex with a slurry including a solvent and a second binder (step (ii)).

In particular, in the step (i), the clustered complex may be prepared by applying energy, the electrode active material, the solid electrolyte, the conductive material, and the first binder may be clustered to form the complex rather than a mixture formed by simple mixing, and may uniformly disperse the first binder that is difficult to be dispersed (see steps 1 and 2 of FIG. 1).

In the all-solid secondary battery, a factor determining performance of the secondary battery is generally a resistance characteristic of a battery, and the resistance characteristic may be largely affected by a dispersion state of the materials in the active material layer of the cathode or the anode. When the first binder does not have a uniform dispersion state, particles of the electrode active material, the conductive material, and the like present in the electrode active material layer may be agglomerated, such that uniform mixing with the binder may be difficult. Accordingly, since channel in which current is capable of flowing in the electrode is not locally formed, resistance in the battery may be increased, or a current concentration phenomenon may occur, which may inhibit performance and stability of the secondary battery.

Further, when a mixture formed by simple mixing without dispersion treatment through energy application is used even though two different kinds of binders are used, the dispersion of the first binder may not be easily performed, such that it may difficult to expect an excellent effect in view of capacity property and life-span property of the secondary battery. In particular, since the first binder particles may not be easily dispersed in the slurry, and all of the solids each having different size density of the electrode active material, the solid electrolyte, and the conductive material are difficult to be uniformly dispersed, even though both of the first binder and the second binder are used together, there is a limitation in improving life-span property and capacity property of the secondary battery.

Regarding this, according to the present invention, the solids may be mechanically dispersed by applying energy, thereby minimizing agglomeration among the particles, such that the electrode active material, the solid electrolyte, the conductive material, and the first binder may be uniformly dispersed in advance to be clustered, thereby improving performance of the secondary battery, particularly, life-span property and capacity property of the secondary battery.

In the applying of the energy according to an exemplary embodiment of the present invention, the energy may have a range of about 0.01 to 0.5 G, or particularly of about 0.02 to 0.3 G on the basis of G-value calculation.

The energy may be applied by a mechanical milling method or a kneading method selected from the group consisting of ball mill, planetary mill, stirred ball mill, SPEX mill, Planetary mill, Attrition mill, Magento-ball mill, vibrating mill, mortar, non bubbling kneader, planetary mixer, and voltax mixer.

A rotation speed and a rotation time of the mechanical milling method or the kneading method are not specifically limited. For example, when the planetary mill is used, the rotation speed may be several tens to several hundreds of rpm, preferably, 150 to 200 rpm, and the rotation time may be about 0.1 to 100 hours.

Preferably, a content of the electrode active material may be of about 50 to 85 wt %, a content of the solid electrolyte may be of about 10 to 40 wt %, a content of the conductive material may be of about 2 to 5 wt % and a content of the first binder may be of about 1 to 5 wt %, based on 100 wt % of a mixture of the active material and the solid electrolyte. In addition, the content of the conductive material may be of about 1 to 10 wt % and the content of the first binder may be of about 1 to 5 wt %, based on 100 wt % of a mixture of the active material and the solid electrolyte.

In addition, in the step (ii), the slurry may be prepared, by mixing the clustered complex obtained by step (i) with the slurry including the solvent and the second binder (see step 3 of FIG. 1).

According to an exemplary embodiment of the present invention, the slurry may be preferably prepared by stirring the solvent and the second binder through sonication, for example, at 20° C. to 60° C., preferably, at 30° C. to 45° C., wherein the second binder may be uniformly dispersed in the solvent.

Meanwhile, the present invention may provide an electrode including an electrode active material layer including the electrode active material slurry as described above, and a base layer.

the electrode according to an exemplary embodiment of the present invention may include the electrode active material layer including the electrode active material slurry including the clustered complex and the slurry; and the base layer. The clustered complex may include the electrode active material, the solid electrolyte, the conductive material, and the first binder, and the slurry may include the solvent and the second binder.

As shown FIG. 1, a manufacturing method of an electrode according to an exemplary embodiment of the present invention may include: mixing an electrode active material, a solid electrolyte, and a conductive material (step 1);

forming a clustered complex by adding a first binder to the mixture and applying energy (step 2); preparing an electrode active material slurry by adding a slurry including a solvent and a second binder to the clustered complex (step 3); and applying the electrode active material slurry on a substrate (step 4).

In the electrode according to an exemplary embodiment of the present invention, in the electrode active material layer formed by applying the electrode active material slurry on the substrate, as shown in FIG. 1, the first binder may be applied on the surface of the electrode active material, and the second binder may be present and crossing between the electrode active materials.

Figure 2:
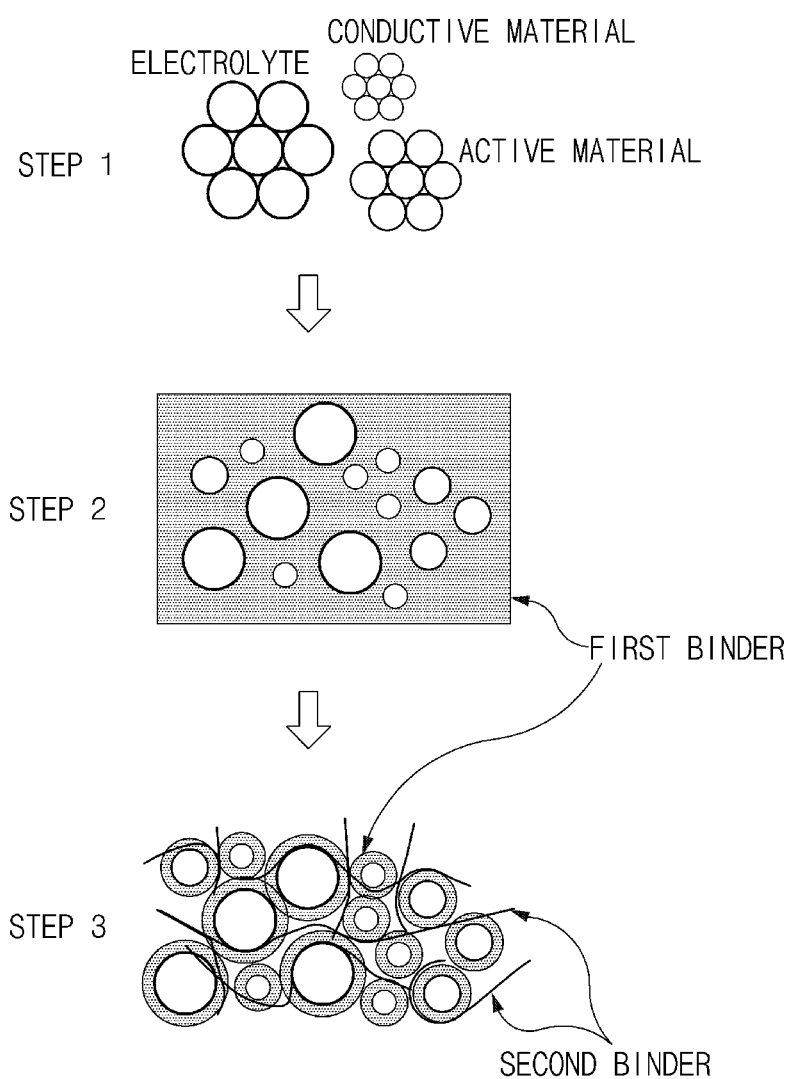
FIG. 2 illustrates a manufacturing method of an electrode and an electrode active material layer (b) applied on a substrate according to the related art.

Meanwhile, FIG. 2 shows an example of a manufacturing method of an electrode and an electrode active material layer according to the related art. As shown in FIG. 2, the manufacturing method of the electrode may include: mixing an electrode active material, a solid electrolyte, and a conductive material (step 1); preparing an electrode active material slurry by adding a slurry including a binder and a solvent to the mixture, followed by mixing (step 2); and applying the electrode active material slurry on a substrate (step 3).

In this case, generally, as shown in FIG. 2, the electrode active material, the solid electrolyte, the conductive material, and the binder are not clustered, but the particles may be non-uniformly and simply mixed, and the binder may be combined with the particles in a net form and may be present in a crossed form (surface contact) among the electrode active materials.

Meanwhile, the electrode according to an exemplary embodiment of the present invention may be a cathode or an anode, and accordingly, the base layer may be a cathode current collector or an anode current collector. Preferably, the electrode may be the cathode.

In addition, the present invention may provide an all-solid secondary battery including the electrode as described above.

Figure 3:
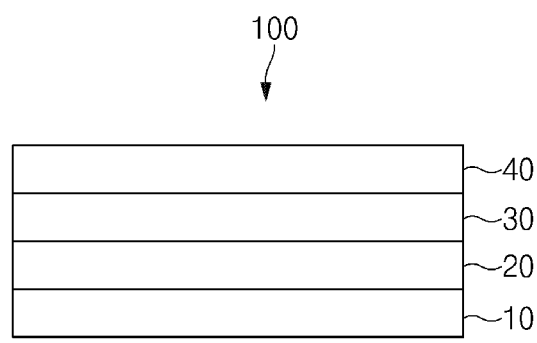
FIG. 3 illustrates an exemplary all-solid secondary battery according to an exemplary embodiment of the present invention.
Figure 4:
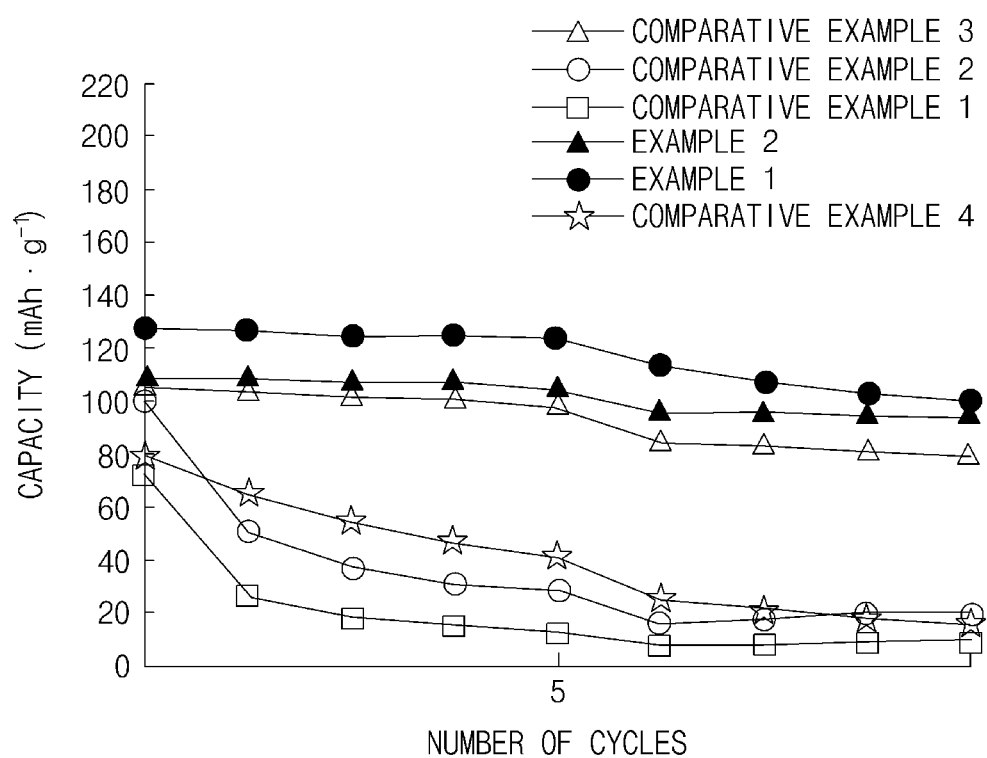
FIG. 4 is a graph showing capacity property according to the number of cycles, of all-solid secondary batteries of Examples 1 and 2 and Comparative Examples 1 to 4 of the present invention.
Figure 5:
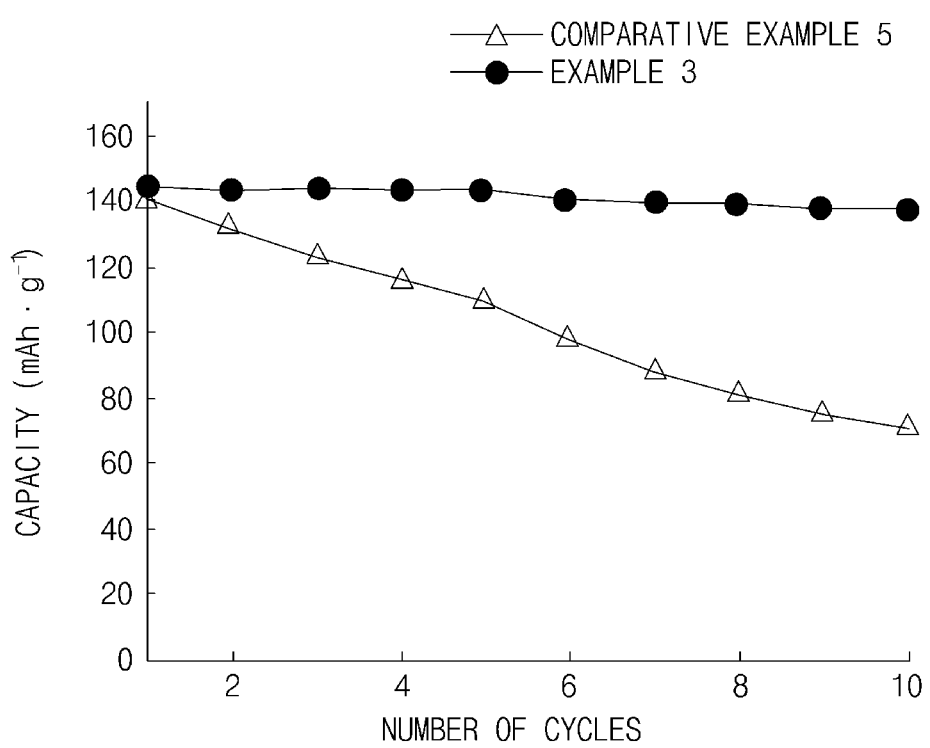
FIG. 5 is a graph showing capacity property according to the number of cycles, of all-solid secondary batteries of Example 3 and Comparative Example 5 of the present invention.

Upon reviewing FIG. 3, the all-solid secondary battery 100 according to an exemplary embodiment of the present invention may be configured to include a cathode current collector 10, a cathode active material layer 20, a solid electrolyte layer 30, and an anode layer 40. Further, the cathode of the all-solid secondary battery 100 may be configured of the cathode current collector 10 and the cathode active material layer 20, and the anode layer 40 may include an anode current collector and an anode active material layer, and accordingly, an anode of the all-solid secondary battery 100 may be configured of the anode current collector and the anode active material layer.

The cathode current collector 10 according to an exemplary embodiment of the present invention may be a metal having high conductivity, and may be any metal in which the electrode active material slurry may be easily adhered, without having reactivity within a voltage range of a battery. Non-limiting examples of the cathode current collector may include aluminum, nickel, foil made of combinations thereof, etc.

In addition, the anode layer 40 according to an exemplary embodiment of the present invention may include the anode current collector and the anode active material layer.

The anode current collector may be generally formed at a thickness of about 3 μm to 500 μm. The anode current collector is not specifically limited as long as it has conductivity without causing chemical change in the battery, and may include, for example, copper, stainless steel, aluminum, nickel, titanium, sintered carbon, materials surface-treated with carbon, nickel, titanium, silver, and the like, on a surface of copper or stainless steel, aluminum-cadmium alloy, and the like. Further, similar to the cathode current collector, adhesion of the anode active material may be enhanced by forming fine concavo-convex on a surface. The anode current collector may have various forms such as a film, a sheet, a foil, a net, a porous structure, a foam, a non-woven fabric, and the like. Further, as the anode, an Li—In foil or Li—In power may be used.

The cathode and the anode may be manufactured by applying electrode active material slurries each using the cathode active material and the anode active material. For example, the cathode active material slurry and the anode active material slurry may be applied on each current collector, at a thickness of about 100 μm to 500 μm, or particularly of about 150 μm to 300 μm, and removing a solvent through a dry process.

In the manufacturing method, the cathode active material layer or the anode active material layer including the first binder and the second binder may contain a predetermined content of binder having strong adhesion, thereby minimizing delamination between the cathode active material layer or the anode active material layer and the solid electrolyte layer. The applying of the electrode active material slurries, i.e., the cathode active material slurry and the anode active material slurry on each current collector may be performed by a die coater, a doctor blade, or the like. From the electrode active material slurries applied on each current collector, the solvent may be removed by heat treatment.

A temperature for the heat treatment may be about 20 to 150° C., and a time for the heat treatment may be about 10 to 50 minutes. After the heat treatment, the solvent may be reduced by vacuum drying. The vacuum drying may be performed at a temperature of about 40 to 200° C., or particularly of about 60 to 150° C.

The solid electrolyte layer according to an exemplary embodiment of the present invention may include a lithium ion conductor comprising an inorganic compound, as an inorganic solid electrolyte. The lithium ion conductor may be, for example, any one selected from the group consisting of $Li_3N$, LISICON, LIPON($Li_{3+y}PO_{4-x}N_x$), thio-LISICON ($Li_{3.25}Ge_{0.25}P_{0.75}S_4$), $Li_2S$ alone or $Li_2S$—$P_2S_5$, $Li_2S$—$SiS_2$, $Li_2S$—$GeS_2$, $Li_2S$—$B_2S_5$, $Li_2S$—$Al_2S_5$, $Li_2O$—$Al_2O_3$—$TiO_2$—$P_2O_5$ (LATP) and argyrodite, and mixtures thereof. The inorganic compound may have a crystalline structure, an amorphous structure, a glassy structure, a glass ceramic structure, or the like. Among the inorganic solid electrolytes, inorganic solid electrolytes comprising amorphous $Li_2S$—$P_2S_5$, glass ceramic $LiAlTiPO_x$, and the like, and having lithium ion conductivity of about $10^{-4}$ S/cm or greater suitably may be used.

The all-solid secondary battery related with the present exemplary embodiments may be manufactured by stacking materials of the cathode, the solid electrolyte layer, and the anode, followed by pressing.

Hereinafter, Examples will be provided in detail to specifically describe the present invention. However, the following Examples according to the present invention may be modified into various embodiments, and should not be interpreted as limiting the scope of the present invention. These Examples of the present invention are provided so that those skilled in the art may thoroughly understand the present invention.

EXAMPLE

Hereinafter, Examples and Experimental Examples are provided by way of example, but the present invention is not limited thereto.

Example 1

<Preparation of Cathode Active Material Slurry>

Step i) Formation of Clustered Complex

A clustered complex was obtained by mixing a cathode active material ($LiCoO_2$) and a solid electrolyte $Li_2S$—$P_2S_5$ (mol % ratio of 80:20) at a weight ratio of 80:20, and adding a conductive material (Super C65, TIMCAL) having a content of 2 wt % and polytetrafluoroethylene (PTFE) which is a first binder having an average particle size ($D_{50}$) of 1 μm and a content of 4 wt % each weighted based on 100 wt % of a total mixture of the cathode active material and the solid electrolyte by using a ball milling mixer at a rate of 200 rpm for 5 minutes, and applying high energy having 0.2 G on the basis of G-value calculation thereto.

Step ii) Preparation of Cathode Active Material Slurry

A cathode active material slurry was prepared by adding an NBR-xylene solution in which NBR having a content of 5 wt % was dissolved so that nitrile butadiene rubber (NBR) as a second binder had a content of 1 wt % based on 100 wt % of the mixture of the cathode active material and the solid electrolyte, to the clustered complex of Step i), and further adding a solvent having a solid content of about 65 wt % based on the cathode active material slurry, followed by mixing using a mortar.

<Manufacture of Cathode>

The prepared cathode active material slurry was casted on a carbon-coated aluminum (Al) foil by using a doctor blade, and dried at mom temperature for about 30 minutes and at a temperature of 120° C. for 1 hour, thereby obtaining a cathode including a cathode active material layer.

<Manufacture of All-solid Secondary Battery>

An all-solid secondary battery was manufactured in a cylindrical mold having an internal diameter of 1.3 cm under an inert gas atmosphere, by using the cathode. $Li_2S$—$P_2S_5$ (mol % ratio: 80:20) amorphous powder (100 mg) as a solid electrolyte powder was inserted in a cylindrical mold, followed by press-molding, thereby forming a solid electrolyte layer.

The cathode was stacked on one surface of the solid electrolyte layer and Li—In powder was stacked on the other surface thereof, followed by pressing, thereby manufacturing a uniaxial-pressing molded pellet in a coin cell.

Example 2

A cathode active material slurry, a cathode, and an all-solid secondary battery coin cell were prepared as the same manner as in Example 1 except for using 2 wt % of polytetrafluormethylene (PTFE) as the first binder based on 100 wt % of a total mixture of the cathode active material and the solid electrolyte.

Example 3

A cathode active material slurry, a cathode, and an all-solid secondary battery coin cell were prepared as the same manner as in Example 1 except for mixing the cathode active material ($LiCoO_2$) and the solid electrolyte $Li_2S$—$P_2S_5$ (mol % ratio of 80:20) at a weight ratio of 65:35, and using 5 wt % of polytetrafluoroethylene (PTFE) as the first binder based on 100 wt % of a total mixture of the cathode active material and the solid electrolyte.

Comparative Example 1

A cathode active material slurry was obtained by mixing the cathode active material ($LiCoO_2$) and the solid electrolyte $Li_2S$—$P_2S_5$ (mol % ratio of 80:20) at a weight ratio of 80:20, and adding a conductive material (Super C65, TIMCAL) having a content of 2 wt % and nitrile butadiene rubber (NBR) as a binder having a content of 4 wt % each weighted based on 100 wt % of a total mixture of the cathode active material and the solid electrolyte, to the mixture, and adding a solvent having a solid content of about 65 wt %, followed by mixing. A cathode and an all-solid secondary battery coin cell were prepared as the same manner as in Example 1 except for using the cathode active material slurry as obtained above.

Comparative Example 2

A cathode active material slurry, a cathode, and an all-solid secondary battery coin cell were prepared as the same manner as in Comparative Example 1 except for using nitrile butadiene rubber (NBR) having a content of 3 wt %.

Comparative Example 3

A cathode active material slurry, a cathode, and an all-solid secondary battery coin cell were prepared as the same manner as in Comparative Example 1 except for using nitrile butadiene rubber (NBR) having a content of 2 wt %.

Comparative Example 4

A cathode active material slurry was obtained by mixing the cathode active material ($LiCoO_2$) and the solid electrolyte $Li_2S$—$P_2S_5$ (mol % ratio of 80:20) at a weight ratio of 80:20, and adding a conductive material (Super C65, TIMCAL) having a content of 2 wt %, polytetrafluoroethylene (PTFE) as a first binder having a content of 2 wt %, and nitrile butadiene rubber (NBR) having a content of 1 wt %, based on 100 wt % of a total mixture of the cathode active material and the solid electrolyte, and adding a solvent having a solid content of about 65 wt % based on the cathode active material slurry, followed by mixing. A cathode and an all-solid secondary battery coin cell were prepared as the same manner as in Example 1 except for using the cathode active material slurry as obtained above.

Comparative Example 5

A cathode active material slurry, a cathode, and an all-solid secondary battery coin cell were prepared as the same manner as in Comparative Example 1 except for mixing the cathode active material ($LiCoO_2$) and the solid electrolyte $Li_2S$—$P_2S_5$ (mol % ratio of 80:20) at a weight ratio of 65:35, and using nitrile butadiene rubber (NBR) having a content of 1 wt %.

Experimental Example 1

Capacity Property of All-solid Secondary Battery

In order to measure capacity according to charge and discharge cycle of the all-solid secondary battery coin cells of Examples 1 to 3 and Comparative Examples 1 to 5, each coin cell was charged at 25° C. under a constant current (CC)

condition with 0.05 C up to 3.68 V (vs.Li—In), and discharged under a constant current (CC) condition with 0.05 C up to 2.38 V (vs.Li—In), and capacity thereof was measured. The charge and discharge processes were repeated 1st to 5th cycles. In 5th to 10th cycles, the discharge process was performed under a constant current (CC) condition with 0.1 C up to 2.38 V. Results thereof were shown in FIGS. 1 and 2.

As shown in FIG. 1, it could be appreciated that Examples 1 and 2 had remarkably improved capacity property according to cycle of secondary battery as compared to Comparative Examples 1 to 4.

Particularly, Examples 1 and 2 of the present invention had about 100 mAhg$^{-1}$ or greater of capacity property during 0 to 10th cycles. It could be appreciated that Examples 1 and 2 rarely had a capacity change, particularly, up to 0 to 5th cycles, and further, a reduction width of a capacity property slope in Examples 1 and 2 was less about 10% even in 5th to 10th cycles, which was remarkably reduced as compared to Comparative Examples.

On the contrary, in Comparative Examples 1, 2, and 4, the capacity property was remarkably reduced from initial 0 to 1st cycle. In addition, in Comparative Example 3, the capacity change was rarely shown up to 0 to 5th cycles, but the capacity property was reduced as compared to the initial cycle, which was less than about 85 mAhg$^{-1}$ in 6th to 10th cycles. Comparative Examples 1, 2 and 4 had less than 40 mAhg$^{-1}$ of capacity property for 5th to 10th cycles.

Further, in Comparative Example 4 in which two kinds of binders, i.e., polytetrafluormethylene (FPFE) as a first binder and nitrile butadiene rubber (NBR) as a second binder were used, but clustering through energy application was not performed, the capacity was remarkably reduced as the cycles proceeded, and after 7th cycle, the capacity property was less than 40 mAhg$^{-1}$, which was similar to the capacity property of Comparative Example 2 without including polytetrafluoroethylene (PTFE).

Accordingly, it could be appreciated from FIG. 1 that the compound of Example in which a clustered complex was formed by adding polytetrafluoroethylene (PTFE) as first binder particles, and a slurry including nitrile butadiene rubber (NBR) as a second binder was added thereto had a capacity property improved by about 60% or greater as compared to Comparative Examples 1 and 2 in which polytetrafluoroethylene (PTFE) was not included and the clustered complex was not formed.

Further, upon comparing Examples 1 and 2 of the present invention with Comparative Example 4, it was confirmed that Examples 1 and 2 of the present invention had a capacity property improved by about 60% or greater as compared to Comparative Example 4 using the electrode active material slurry that was not clustered but obtained by simple mixing even though two kinds of binders were used.

In addition, even though Examples 1 and 2 of the present invention included the second binder (NBR) having a smaller content of 1 wt %, Examples 1 and 2 had remarkably improved capacity property as compared to Comparative Examples 1 to 3 including the second binder having a content of 2 to 4 wt % or more.

Further, as shown in FIG. 2, it could be confirmed that Example 3 including 5 wt % of polytetrafluoroethylene (PTFE) as the first binder had remarkably improved capacity property according to cycle as compared to Comparative Example 5 without including PTFE.

Upon specifically reviewing, it could be appreciated that Example 3 rarely had a capacity property change, but maintained capacity over 140 mAhg$^{-1}$ during 0 to 10th cycles. On the contrary, in Comparative Example 5 without including FTFE, a capacity was reduced to be less than 100 mAhg$^{-1}$ after the 6th cycle, and a capacity slope from 0 to 10th cycles was remarkably reduced, and accordingly, the capacity property thereof was reduced by about a half (½) or greater as compared to that of the initial cycle.

As described above, according to the exemplary embodiments of the present invention, the electrode active material slurry according to an exemplary embodiment of the present invention may include the clustered complex including the first binder and the slurry including the second binder to decrease a surface area of the overall complex, such that adhesion property with the current collector may be sufficiently secured even by using a small amount of binder, and performance of the all-solid secondary battery may be improved.

Further, the preparation method of an electrode active material slurry according to an exemplary embodiment of the present invention may include firstly forming the clustered complex having a cluster shape by combining the electrode active material, the solid electrolyte, the conductive material, and the first binder through energy application, before mixing the electrode active material with the slurry, thereby decreasing the surface area of the overall complex, such that contents of the binders used for preparing the slurry may be reduced. In addition, uniform dispersibility and adhesion property with the current collector may be further improved by the energy application.

Further, the electrode including the electrode active material slurry and the all-solid secondary battery including the electrode according to an exemplary embodiment of the present invention may have excellent capacity property, life-span property, energy density, etc.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. An electrode active material slurry comprising:
a clustered complex and a slurry,
wherein the clustered complex comprises an electrode active material, a solid electrolyte, a conductive material, and a first binder, and the slurry comprises a solvent and a second binder,
wherein the first binder is applied on a surface of the electrode active material, and the second binder is present between the electrode active materials,
wherein the first binder comprises polytetrafluoroethylene (PTFE).

2. The electrode active material slurry according to claim 1, wherein the first binder is in a form of particles having an average particle size ($D_{50}$) of about 0.01 μm to 10 μm.

3. The electrode active material slurry according to claim 1, wherein the second binder is any one selected from the group consisting of styrene butadiene rubber (SBR), butadiene rubber (BR), nitrile butadiene rubber (NBR), styrene butadiene styrene block polymer (SBS), styrene ethylene butadiene block polymer (SEB), styrene-(styrene butadiene)-styrene block polymer, natural rubber (NR), isoprene rubber (IR), ethylene-propylene-diene terpolymer (EPDM) and poly(ethylene-co-propylene-co-5-methylene-2-norbornene), or mixtures thereof.

4. The electrode active material slurry according to claim 1, wherein a weight ratio of the first binder and the second binder is about 1:0.1 to 2 (parts by weight).

5. The electrode active material slurry according to claim 1, wherein the first binder has a content of about 1 to 5 wt % based on 100 wt % of a mixture of the active material and the solid electrolyte.

6. The electrode active material slurry according to claim 1, wherein the second binder has a content of about 1 to 10 wt % based on 100 wt % of a mixture of the active material and the solid electrolyte.

7. The electrode active material slurry according to claim 1, wherein the clustered complex has a specific surface area of about 0.5 to 1 $m^2/g$.

8. The electrode active material slurry according to claim 1, wherein the electrode active material has a content of about 50 to 85 wt %, the solid electrolyte has a content of about 10 to 40 wt %, the conductive material has a content of about 2 to 5 wt %, and the first binder has a content of about 1 to 5 wt %, all the wt % based on 100 wt % of a mixture of the active material and the solid electrolyte.

9. The electrode active material slurry according to claim 1, wherein the solid electrolyte is a sulfide-based solid electrolyte.

10. The electrode active material slurry according to claim 1, wherein, when the electrode is a cathode, the electrode active material slurry has a solid content of about 40 to 70 wt % based on a total weight of a cathode active material slurry.

11. A cathode comprising:
    an electrode active material layer comprising an electrode active material slurry of claim 1; and
    a base layer.

12. An all-solid secondary battery comprising a cathode of claim 11.

* * * * *